(12) United States Patent
Young

(10) Patent No.: US 10,053,171 B1
(45) Date of Patent: Aug. 21, 2018

(54) ANTI-THEFT DEVICE FOR BICYCLE LOCK

(71) Applicant: PINHEAD COMPONENTS, INC., Edmonton (CA)

(72) Inventor: Linda Young, Edmonton (CA)

(73) Assignee: Pinhead Components Inc., Edmonton, Alberta (CA)

( * ) Notice: Subject to any disclaimer, the term of this patent is extended or adjusted under 35 U.S.C. 154(b) by 0 days.

(21) Appl. No.: 15/667,694

(22) Filed: Aug. 3, 2017

(51) Int. Cl.
    *E05B 71/00* (2006.01)
    *B62H 5/00* (2006.01)
    *F16B 23/00* (2006.01)
    *E05B 67/00* (2006.01)

(52) U.S. Cl.
    CPC ............ *B62H 5/00* (2013.01); *E05B 71/00* (2013.01); *F16B 23/0069* (2013.01); *F16B 23/0076* (2013.01); *E05B 67/003* (2013.01)

(58) Field of Classification Search
    CPC ......... E05B 71/00; E05B 67/003; B62H 5/00; F16B 23/0069; F16B 23/0076
    USPC .......................................... 70/30, 49, 58, 18
    See application file for complete search history.

(56) References Cited

U.S. PATENT DOCUMENTS

| | | | | |
|---|---|---|---|---|
| 4,302,137 A * | 11/1981 | Hart | .................... | F16B 23/0069 411/432 |
| 5,135,330 A * | 8/1992 | Chen | .................... | B62K 19/36 301/124.2 |
| 5,475,993 A * | 12/1995 | Kuo | .................... | E05B 67/003 411/504 |
| 6,341,927 B2 * | 1/2002 | Hampson | ............ | F16B 23/0069 411/403 |
| 6,571,588 B1 * | 6/2003 | Yuen | .................... | B62H 5/00 411/402 |
| 6,609,399 B1 * | 8/2003 | Daniels, Jr. | ............ | B62H 5/003 70/14 |
| 6,615,956 B1 * | 9/2003 | Chuang | ................. | B60T 11/046 188/24.18 |
| 6,682,281 B1 * | 1/2004 | Larsen | ................... | F16B 35/04 411/115 |
| 6,751,992 B1 * | 6/2004 | Esquilin | ................... | B62H 3/02 70/227 |
| 6,923,027 B1 * | 8/2005 | Kuo | .................... | E05B 67/003 70/233 |
| 6,935,214 B2 * | 8/2005 | Korpi | .................... | B25B 13/485 81/121.1 |
| 7,252,470 B1 * | 8/2007 | Sanchez | ................ | B25B 13/485 301/35.621 |
| 7,437,898 B2 * | 10/2008 | Su | .................... | E05B 67/003 70/14 |

(Continued)

*Primary Examiner* — Suzanne L Barrett
(74) *Attorney, Agent, or Firm* — Rosenberg, Klein & Lee

(57) ABSTRACT

A bicycle lock includes a U-shaped body and a pivotal portion pivotably connected to the first end of the U-shaped body. A head is formed on the second end of the U-shaped body and includes a lock unit received therein. The lock unit includes a nut and a core unit which is co-rotated with the nut. The nut is rotated by using a key. The core unit includes a core and a restriction plate which is co-rotated with the core and includes a notch. A safety unit is received in the lock unit and includes an engaging member and a resilient member which biases the engaging member to be engaged with a notch of the restriction plate to prevent the core unit from being rotated. The engaging member includes a protrusion which contacts the outer periphery of the nut to prevent the nut from being rotated by unauthorized tools.

5 Claims, 9 Drawing Sheets

(56) References Cited

U.S. PATENT DOCUMENTS

| | | | | |
|---|---|---|---|---|
| 8,061,169 B2* | 11/2011 | Young | ................... | B62H 5/00 411/910 |
| 8,112,933 B1* | 2/2012 | Swan | ................... | F41G 11/003 403/374.5 |
| 2003/0110820 A1* | 6/2003 | Denby | ................... | B62H 5/00 70/233 |
| 2005/0100424 A1* | 5/2005 | DiStasio | ................ | F16B 39/32 411/329 |
| 2011/0296982 A1* | 12/2011 | Dille | ................... | F16B 39/103 92/165 PR |

* cited by examiner

ANTI-THEFT DEVICE FOR BICYCLE LOCK

BACKGROUND OF THE INVENTION

1. Fields of the Invention

The present invention relates to a bicycle lock, and more particularly, to an anti-theft device for a bicycle lock.

2. Descriptions of Related Art

U.S. Pat. No. 6,341,927 owned by the applicant discloses a tamper resistant fastener which provides a compact and light fastener, and can be used to secure wheel hubs and quick-releases of bicycle seats. The tamper resistant fastener can only be rotated by a specific key.

U.S. Pat. No. 8,061,169 owned by the applicant discloses a locking system with hidden keyed access and which is an improved system relative to U.S. Pat. No. 6,341,927. The locking system is used to a U-shaped shackle, and can be used on bicycles or auto-bikes. The locking system has to be stored in a basket or a storage space when not in use.

The present invention intends to provide an anti-theft device for bicycle locks and the device prevents unauthorized persons to use three tools to unlock the lock.

SUMMARY OF THE INVENTION

The present invention relates to a bicycle lock and comprises a U-shaped body and a pivotal portion which is pivotably connected to the first end of the U-shaped body, and a head is formed on the second end of the U-shaped body and has a lock unit received therein. The bicycle lock is a loop-shaped lock when the pivotal portion is connected to the head. The lock unit includes a nut and a core unit which is co-rotated with the nut. The core unit has a core and a restriction plate which is co-rotated with the core. The restriction plate has a notch defined radially in the outer periphery thereof. A safety unit is received in the lock unit and has an engaging member and a resilient member. The engaging member is axially received in the head and located adjacent to the core unit and the nut. The engaging member includes a base and a protrusion which extends from the top of the base. The resilient member has the first end thereof biasing the rear side of the engaging member. When the lock unit is locked, the engaging member is biased by the resilient member, and the base is engaged with the notch of the restriction plate to prevent the core unit from being rotated. The protrusion contacts the outer periphery of the nut to prevent the nut from being rotated by unauthorized tools.

Preferably, the head includes an installation hole, and the core unit and the nut are received in the installation hole. A cap is connected to the head and partially closes the installation hole. The cap includes an access slot which communicates with a through hole located beneath the access slot. The through hole communicates with the installation hole.

Preferably, the protrusion of the engaging member is a hook-shaped protrusion. A neck is connected between the base and the protrusion.

Preferably, the installation hole includes a path defined radially in the periphery thereof. A post extends from the inner bottom of the path and is lower than the head. The post includes a threaded hole defined therein. The engaging member is movably received in the path. A bolt extends through the second end of the resilient member and is connected to the threaded hole of the post.

Preferably, the neck includes a recess defied in the rear side thereof, and the first end of the resilient member is engaged with the recess.

The protrusion of the engaging member presses the outer periphery of the nut, and the base of the engaging member is engaged with the restriction plate of the core unit. The engaging member secures the nut and the core unit when the lock is in locked status. When even three unauthorized tools are used, the nut and the core unit are not rotated easily, and this feature prolongs time required to unlock the bicycle lock of the present invention.

When using a correct key, the key pushes the engaging member away from the restriction plate and the nut, and the key is engaged with the nut and rotates the core unit to unlock the bicycle lock easily.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
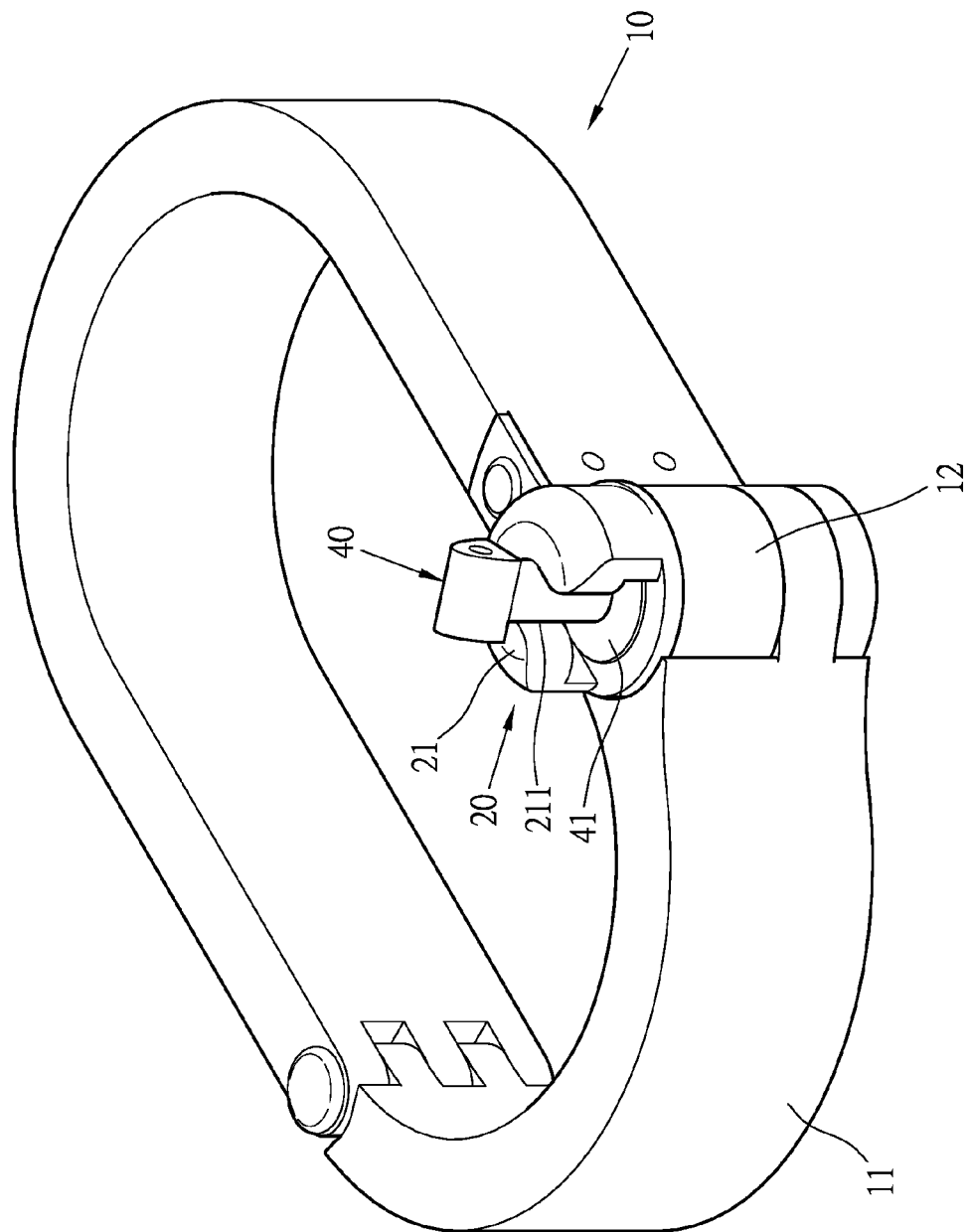
FIG. 1 is a perspective view to show the bicycle lock of the present invention.
Figure 2:
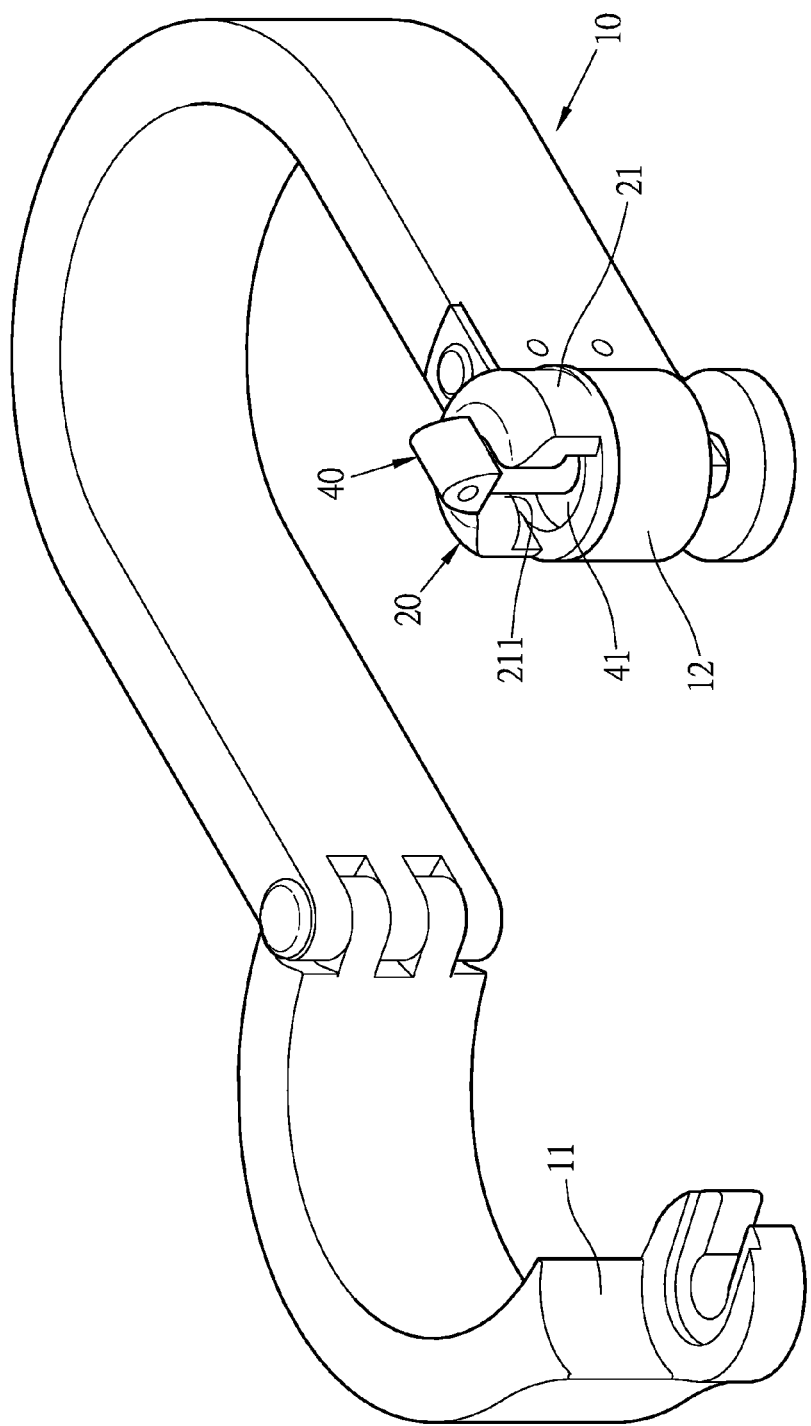
FIG. 2 shows that the pivotal portion is separated from the head, and the bicycle lock of the present invention is unlocked.

Referring to FIGS. 1 and 2, the bicycle lock 10 of the present invention comprises a U-shaped body and a pivotal portion 11 which is pivotably connected to the first end of the U-shaped body. A head 12 is formed on the second end of the U-shaped body and has a lock unit 20 received therein. The bicycle lock 10 is a loop-shaped lock when it is locked and the pivotal portion 11 is connected to the head 12. When the bicycle lock 10 is unlocked, the pivotal portion 11 is separated from the head 12, and an opening is formed in the U-shaped body, the U-shaped body is able to be used to lock a wheel or any desired positions of a bicycle. A key 40 is used to lock or unlock the bicycle lock 10.

Figure 3:
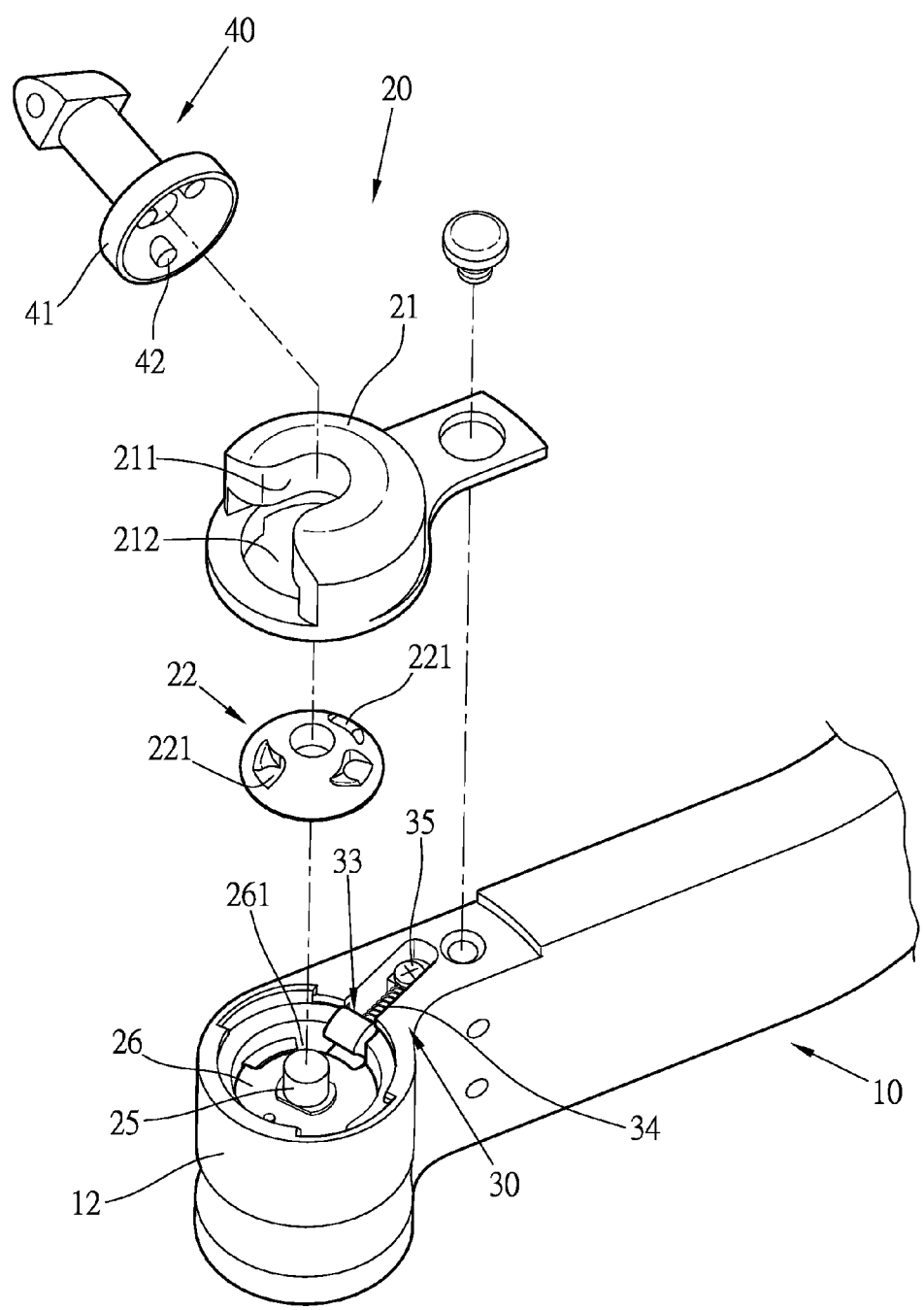
FIG. 3 is an exploded view to show the nut, the cap and the key of the bicycle lock of the present invention.
Figure 4:
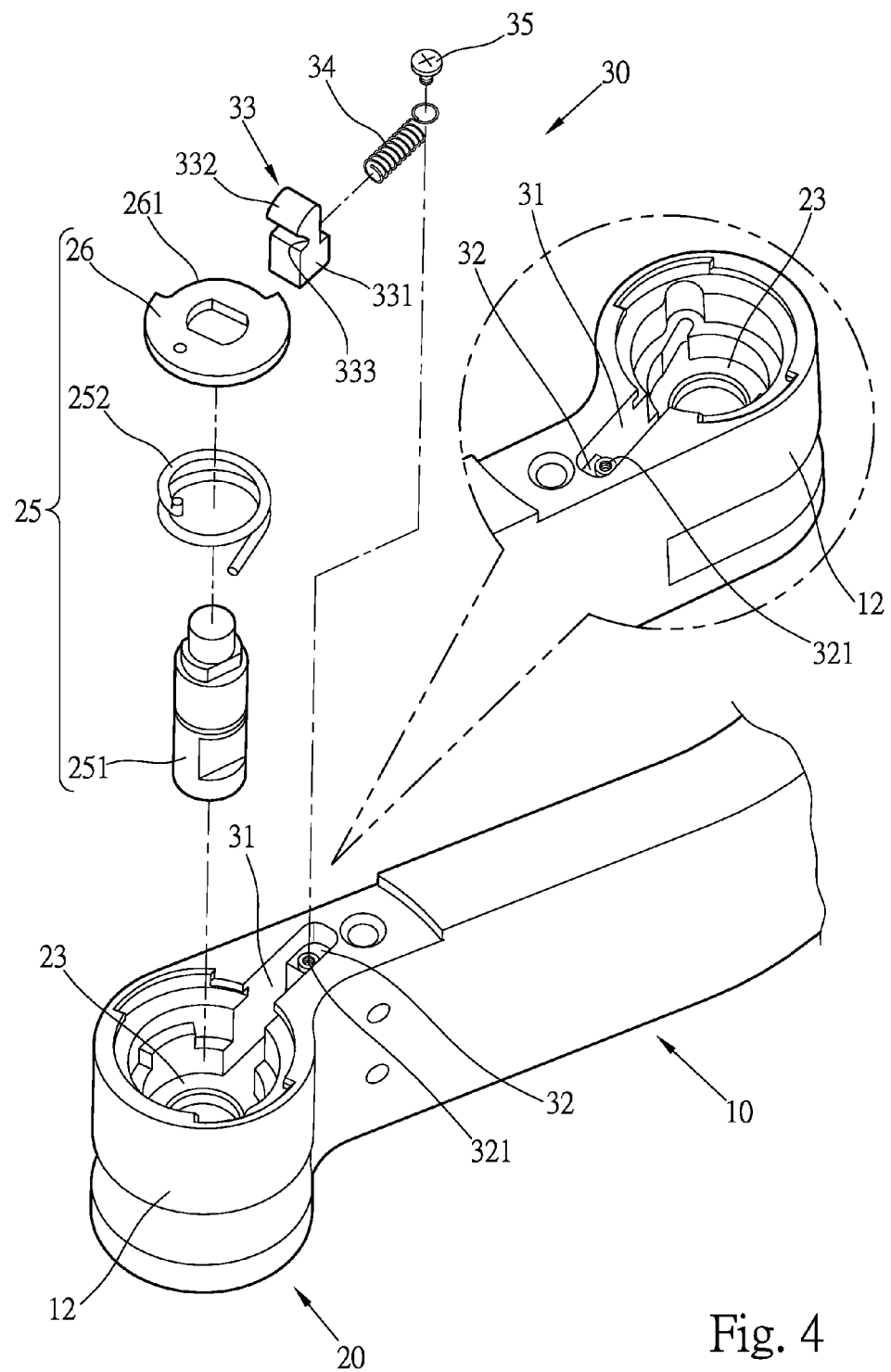
FIG. 4 is an exploded view to show the core unit, the engaging member, the resilient member and the head of the bicycle lock of the present invention.

As shown in FIGS. 3 and 4, the lock unit 20 and the key 40 are disclosed in U.S. Pat. No. 6,341,927. The lock unit 20 includes a nut 22 and a core unit 25. The nut 22 is fixed to the core unit 25 and includes at least three cutouts 221. The core unit 25 is co-rotated with the nut 22. The core unit 25 has a core 251, a spring 252 and a restriction plate 26 which is biased by the spring 252 and co-rotated with the core 251. The restriction plate 26 has a notch 261 defined radially in the outer periphery thereof.

The core unit 25 is installed in the installation hole 23 of the head 12, and the nut 22 is connected to the top of the core unit 25 and located on the restriction plate 26. Specifically, the core 251 extends through the central hole of the nut 22, such that when the key 40 is engaged with the nut 22 and rotates the nut 22, the core 25 is rotated.

Figure 5:
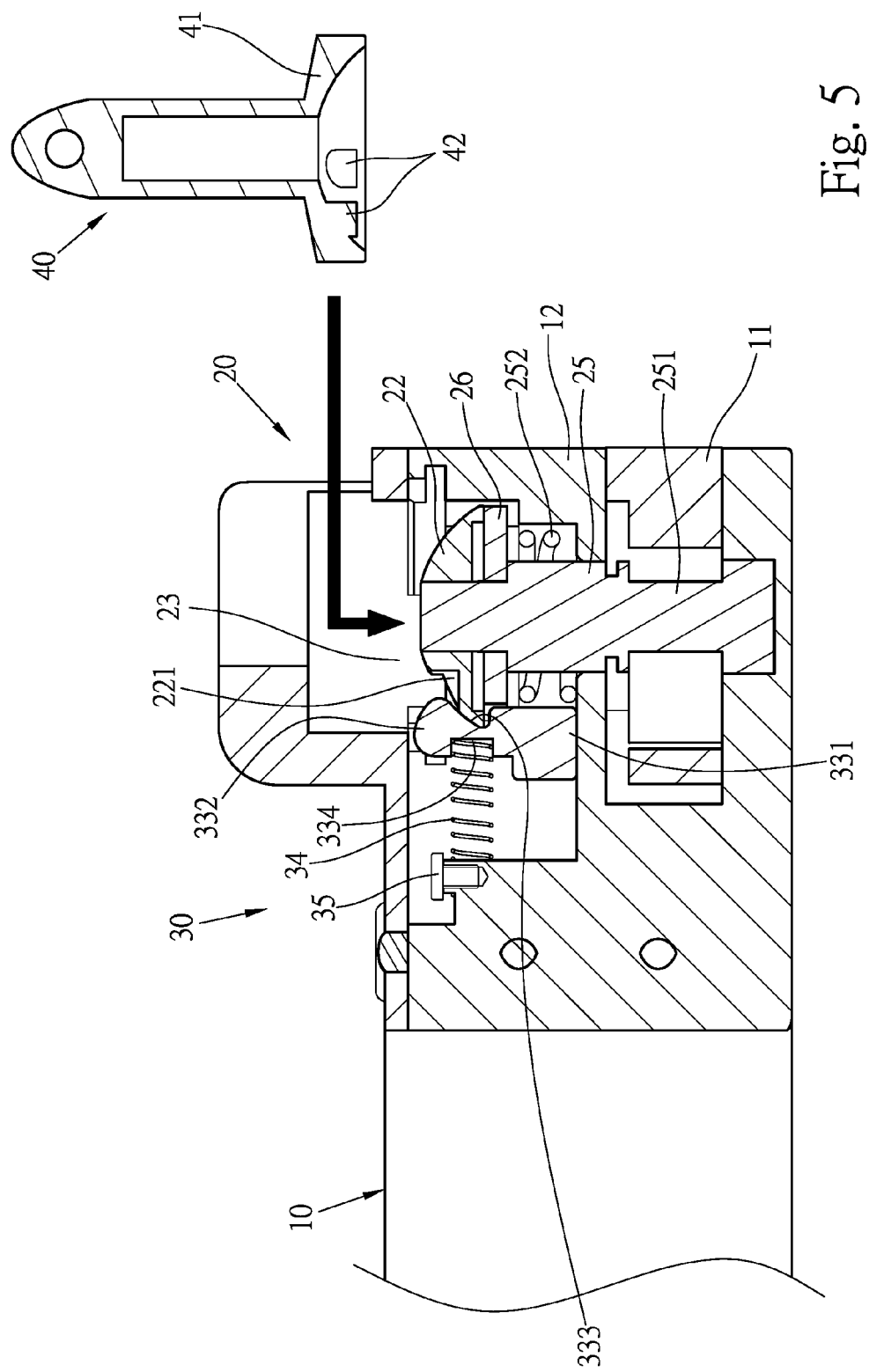
FIG. 5 is a side cross sectional view to show that the key is to be inserted into the head of the lock.

A safety unit 30 is received in the lock unit 20 and has an engaging member 33 and a resilient member 34. The engaging member 33 is axially received in the head 12 and located adjacent to the core unit 25 and the nut 22. The installation hole 23 includes a path 31 defined radially in the periphery thereof. The engaging member 33 is movably received in the path 31. A post 32 extends from the inner bottom of the path 31 and is lower than the head 12. The post 32 includes a threaded hole 321 defined therein. A bolt 35 extends through the second end of the resilient member 34 and is connected to the threaded hole 321 of the post 32. As shown in FIGS. 3, 4 and 5, the engaging member 33 includes a base 331 and a protrusion 332 which extends from the top of the base 331. The protrusion 332 of the engaging member 33 is a hook-shaped protrusion. A neck 333 is connected between the base 331 and the protrusion 332. The neck 33 includes a recess defied in the rear side thereof, and the first end of the resilient member 34 is engaged with the recess. The engaging member 33 is biased by the resilient member and movable in the path 31.

After the core unit 25 and the nut 22 are received in the installation hole 23, and the safety unit 30 is installed in the path 31, a cap 21 is connected to the head 12 and partially closes the installation hole 23 to hide the lock unit 20 and the safety unit 30 as shown in FIG. 3. The cap 21 includes an extension and a bolt extends through the hole in the extension and fixes the cap 21 to the bicycle lock 10. The cap 21 includes an access slot 211 which communicates with a through hole 212 located beneath the access slot 211. The through hole 212 communicates with the installation hole 23.

The key 40 includes an enlarged end portion 41 and multiple rods 42 extend from an inner end of the end portion 41. The end portion 41 radially enters into the access slot 211 and then inserted downward to be engaged with one of the cutouts 221 to rotate the core unit 25 to lock or unlock the bicycle lock 10.

Figure 6:
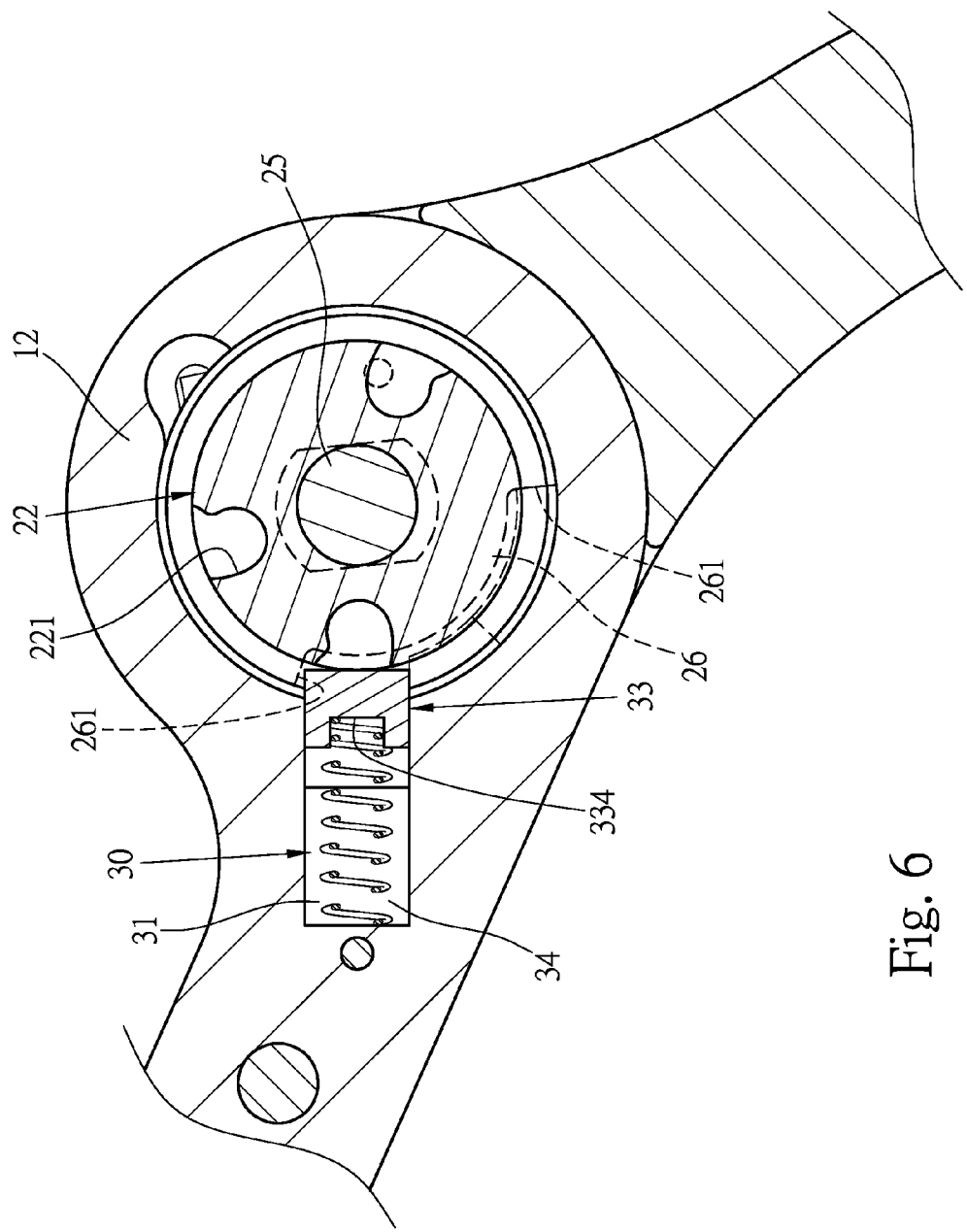
FIG. 6 is a top cross sectional view to show that the bicycle lock is in locked status.

As shown in FIGS. 5 and 6, when the key 40 is not yet inserted into the lock unit 20, the base 331 of the engaging member 33 is engaged with the notch 261 of the restriction plate 26 to prevent the core unit 25 from being rotated, and the neck 333 of the protrusion 332 contacts the outer periphery of the nut 22. The resilient member 34 provides a force to contact against the nut 22 to prevent the nut 22 from being rotated by unauthorized tools.

When an unauthorized person uses three tools and tries to be engaged with the three cutouts 221 of the nut 22 from the access slot 211, the protrusion 332 blocks the cutouts 221 and the base 331 of the engaging member 33 is engaged with the notch 261 of the restriction plate 26, so that the nut 22 cannot be rotated easily. This feature can prolongs the time required to unlock the bicycle lock 10.

Figure 7:
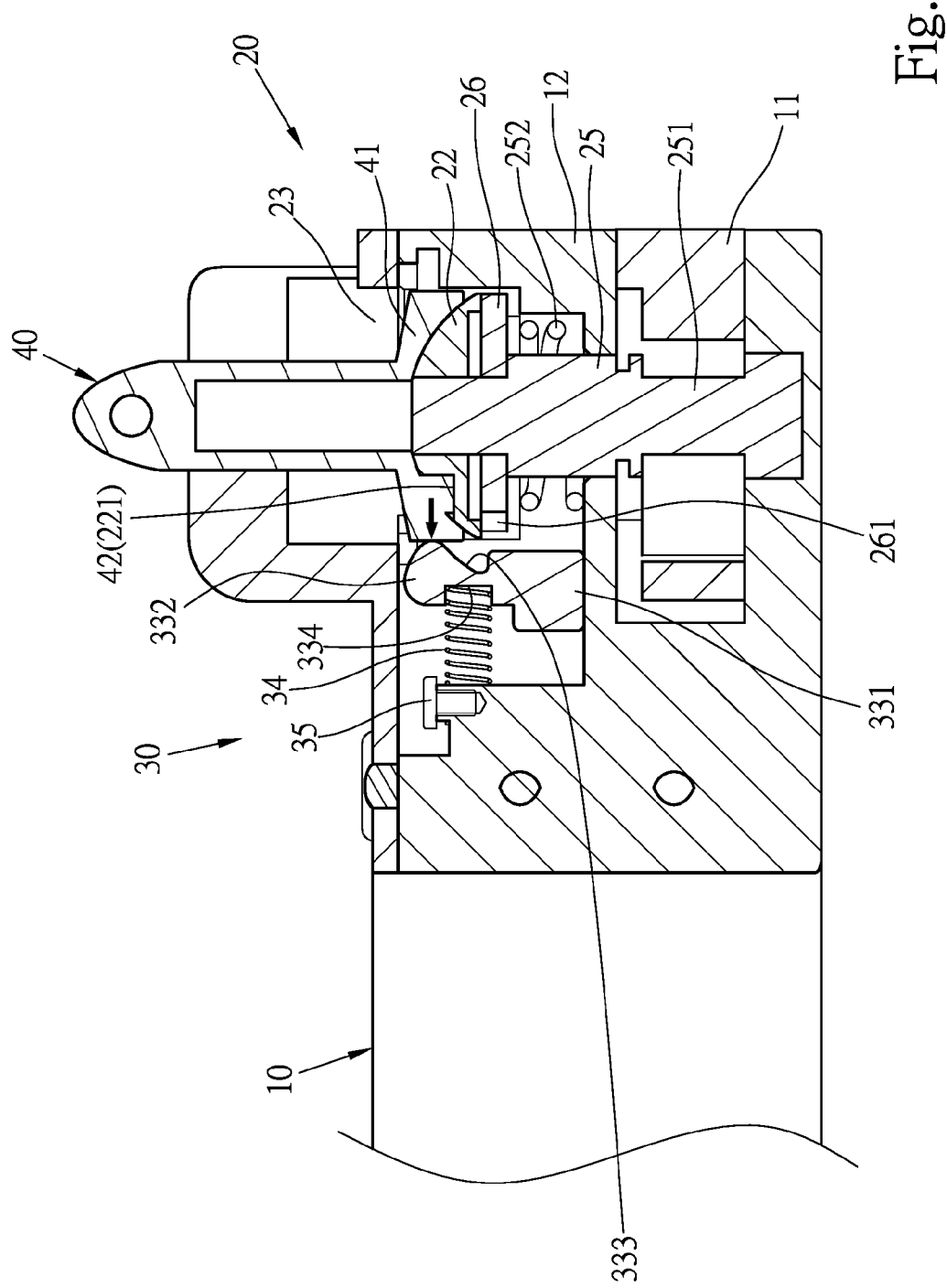
FIG. 7 is a side cross sectional view to show that the key is inserted into the lock, and the engaging member is pushed to compress the resilient member.
Figure 8:
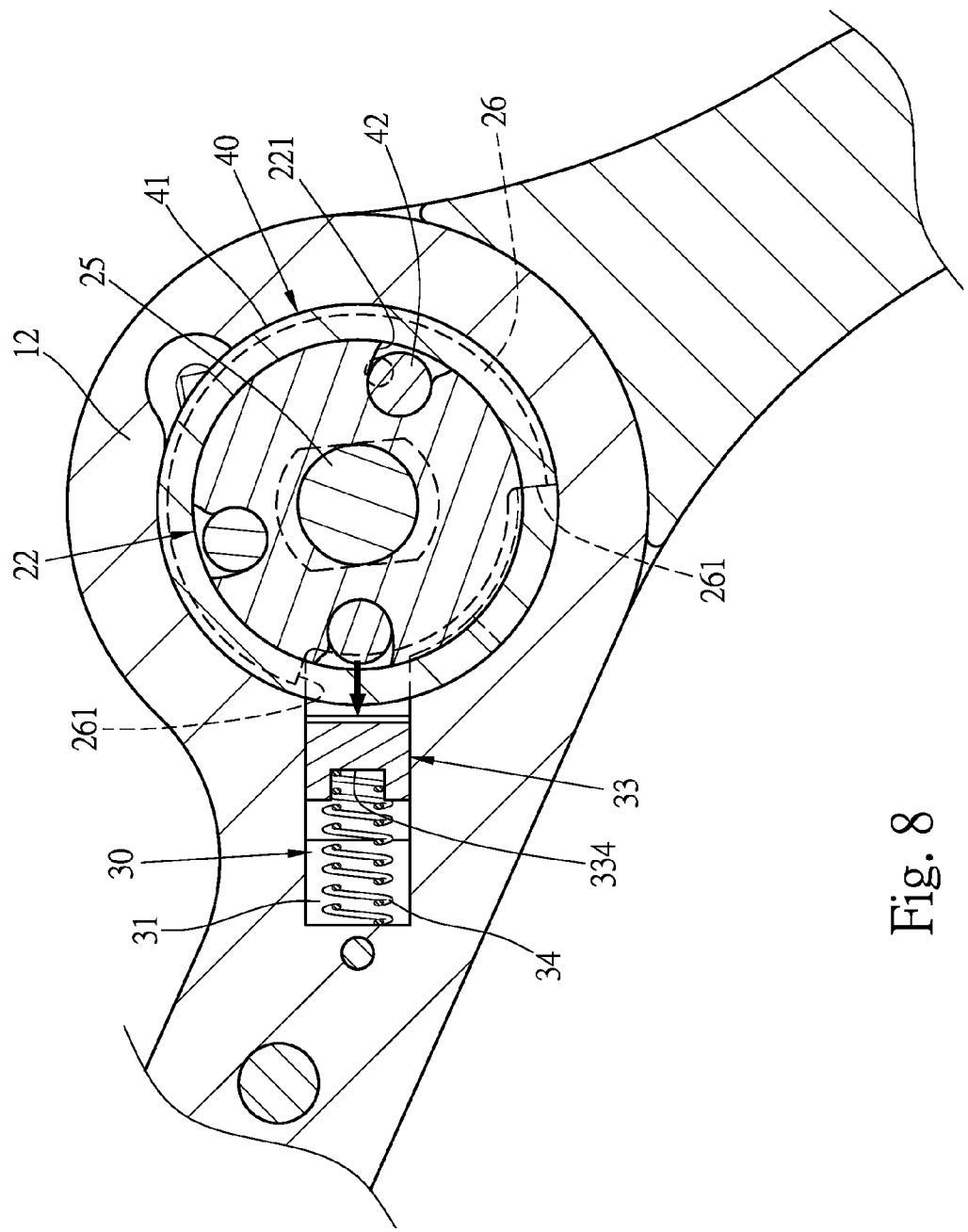
FIG. 8 is a top cross sectional view of the bicycle lock disclosed in FIG. 7.
Figure 9:
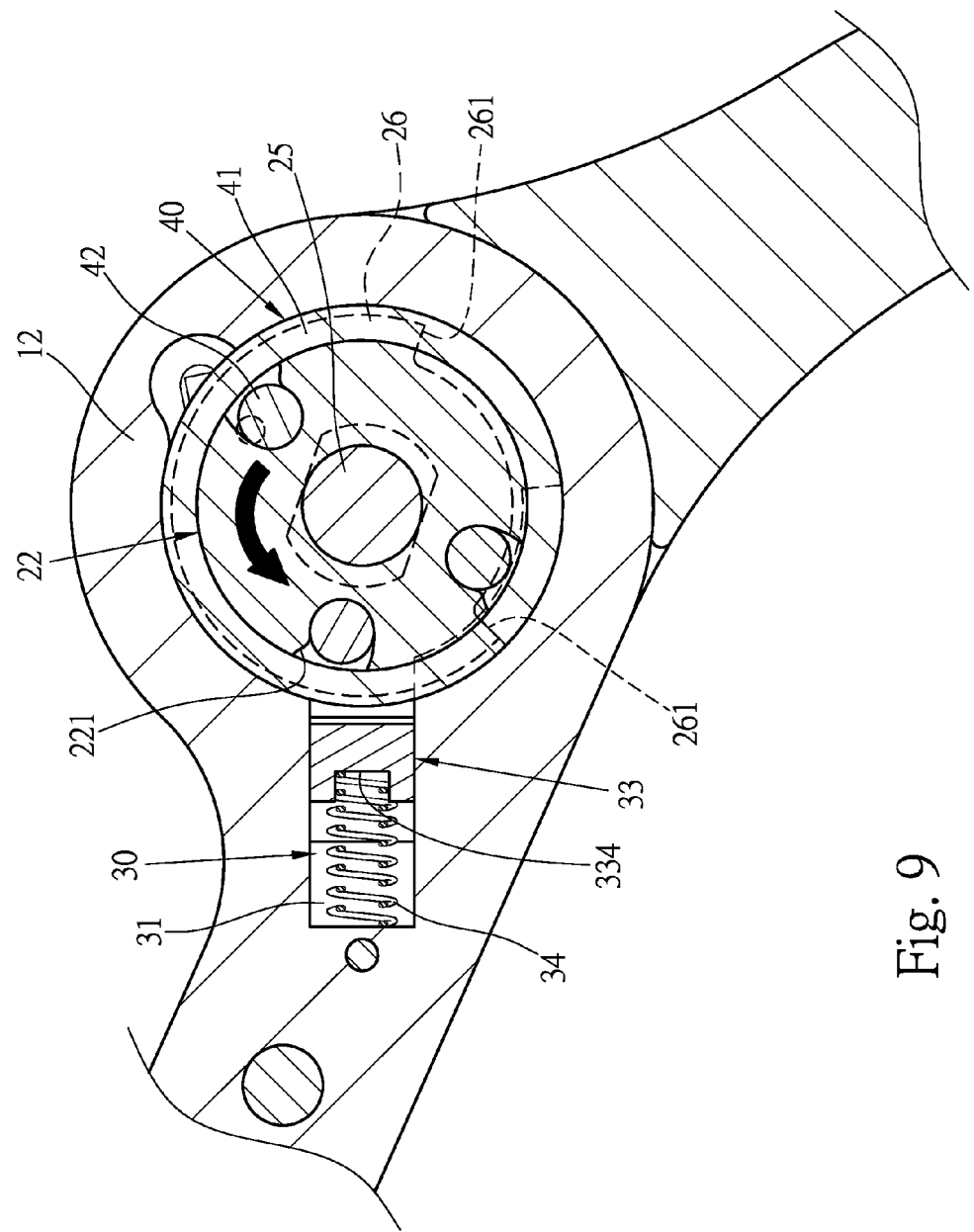
FIG. 9 is a top cross sectional view to show that the key is rotated to unlock the bicycle lock.

As shown in FIGS. 7 and 9, when the user insert the key 40 into the lock unit 20 as described above, the end portion 41 of the key 40 pushes the protrusion 332 away from the nut 22, and the engaging member 33 moves in the path 31 and the resilient member 34 is compressed. The base 331 of the engaging member 33 is disengaged from the notch 261 of the restriction plate 26. The rods 42 are engaged with the cutouts 221 of the nut 22, so that the key 40 is rotated to rotate the core unit 25 to lock or unlock the bicycle lock 10.

While we have shown and described the embodiment in accordance with the present invention, it should be clear to those skilled in the art that further embodiments may be made without departing from the scope of the present invention.

What is claimed is:

1. A bicycle lock comprising:
   a U-shaped body and a pivotal portion pivotably connected to a first end of the U-shaped body, a head formed on a second end of the U-shaped body and having a lock unit received therein, the lock unit having a nut and a core unit which is co-rotated with the nut, the core unit having a core and a restriction plate which is co-rotated with the core, the restriction plate having a notch defined radially in an outer periphery thereof, and
   a safety unit received in the lock unit and having an engaging member and a resilient member, the engaging member axially received in the head and located adjacent to the core unit and the nut, the resilient member having a first end thereof biasing a rear side of the engaging member, the engaging member having a base and a protrusion which extends from a top of the base, when the lock unit is locked, the engaging member being biased by the resilient member, and the base is engaged with the notch of the restriction plate to prevent the core unit from being rotated, the protrusion contacting an outer periphery of the nut to prevent the nut from being rotated by unauthorized tools.

2. The bicycle lock as claimed in claim 1, wherein the head includes an installation hole, the core unit and the nut are received in the installation hole, a cap is connected to the head and partially closes the installation hole, the cap includes an access slot which communicates with a through hole located beneath the access slot, the through hole communicates with the installation hole.

3. The bicycle lock as claimed in claim 1, wherein the protrusion of the engaging member is a hook-shaped protrusion, a neck is connected between the base and the protrusion.

4. The bicycle lock as claimed in claim 2, wherein the installation hole includes a path defined radially in a periphery thereof, a post extends from an inner bottom of the path and is lower than the head, the post includes a threaded hole defined therein, the engaging member is movably received in the path, a bolt extends through a second end of the resilient member and is connected to the threaded hole of the post.

5. The bicycle lock as claimed in claim 3, wherein the neck includes a recess defied in a rear side thereof, the first end of the resilient member is engaged with the recess.

* * * * *